(12) United States Patent
Wilsher

(10) Patent No.: US 7,789,403 B2
(45) Date of Patent: Sep. 7, 2010

(54) VANITY CART WITH MIRROR

(75) Inventor: Sherry Lee Wilsher, Houston, TX (US)

(73) Assignee: Sleeka Vi Int'l, LLC, Houston, TX (US)

( * ) Notice: Subject to any disclaimer, the term of this patent is extended or adjusted under 35 U.S.C. 154(b) by 275 days.

(21) Appl. No.: 12/154,754

(22) Filed: May 27, 2008

(65) Prior Publication Data

US 2009/0295110 A1  Dec. 3, 2009

(51) Int. Cl.
*B62B 1/00* (2006.01)
(52) U.S. Cl. ..................... 280/79.3; 280/651
(58) Field of Classification Search ............. 280/47.28, 280/639, 651, 47.19, 42, 47.35, 79.3, 79.11, 280/47.34; 312/200, 311, 218, 321.5
See application file for complete search history.

(56) References Cited

U.S. PATENT DOCUMENTS

| 4,790,610 | A | * | 12/1988 | Welch et al. ................. 312/218 |
| 4,875,696 | A | * | 10/1989 | Welch et al. ............. 280/47.34 |
| 4,976,450 | A | * | 12/1990 | Ellefson ................. 280/79.11 |
| 5,333,885 | A | * | 8/1994 | Pullman ................... 280/47.19 |
| 5,489,106 | A | * | 2/1996 | Engelking et al. ......... 280/47.35 |
| 5,577,819 | A | | 11/1996 | Olsen |
| 5,634,649 | A | * | 6/1997 | Breining et al. .......... 280/47.35 |
| 5,765,842 | A | | 6/1998 | Phaneuf et al. |
| 6,663,202 | B2 | * | 12/2003 | Spann .................... 312/249.12 |
| 6,669,214 | B1 | | 12/2003 | Domis |
| 6,843,488 | B1 | * | 1/2005 | Tseng ...................... 280/47.35 |
| 7,111,852 | B2 | | 9/2006 | Woods et al. |
| 7,213,817 | B2 | * | 5/2007 | Cheung ........................ 280/42 |
| 7,490,914 | B2 | * | 2/2009 | Greiner ................... 312/321.5 |
| 7,591,382 | B2 | * | 9/2009 | Brock .......................... 211/10 |

* cited by examiner

*Primary Examiner*—Hau V Phan
(74) *Attorney, Agent, or Firm*—Mary J. Gaskin

(57) ABSTRACT

A lightweight vanity cart with a mirror mounted on the top that can pivot from a closed to an open position. The mirror can be illuminated with a light strip. The vanity cart provides receptacles, drawers and racks for organizing and storing hair styling tools and personal care items, including cosmetics, hair styling products, lotions, cleansers, applicators, brushes, etc. The vanity cart, which is mounted on wheels, is easily moved from place to place. It provides electrical receptacles for plugging in the cords of electrical styling tools. A master power cord, which supplies electricity to the receptacles, is plugged into a wall receptacle.

20 Claims, 5 Drawing Sheets

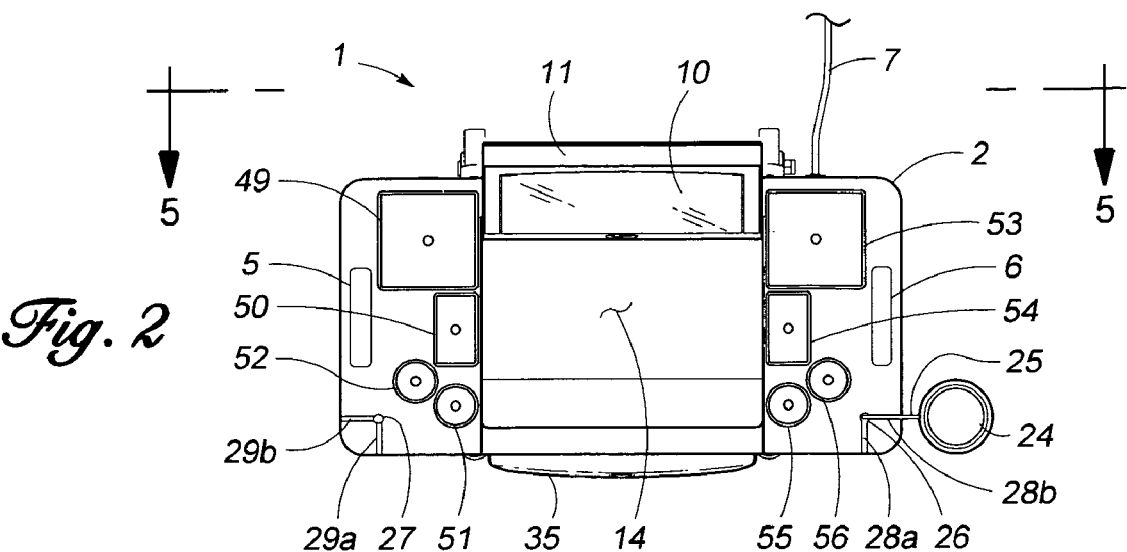
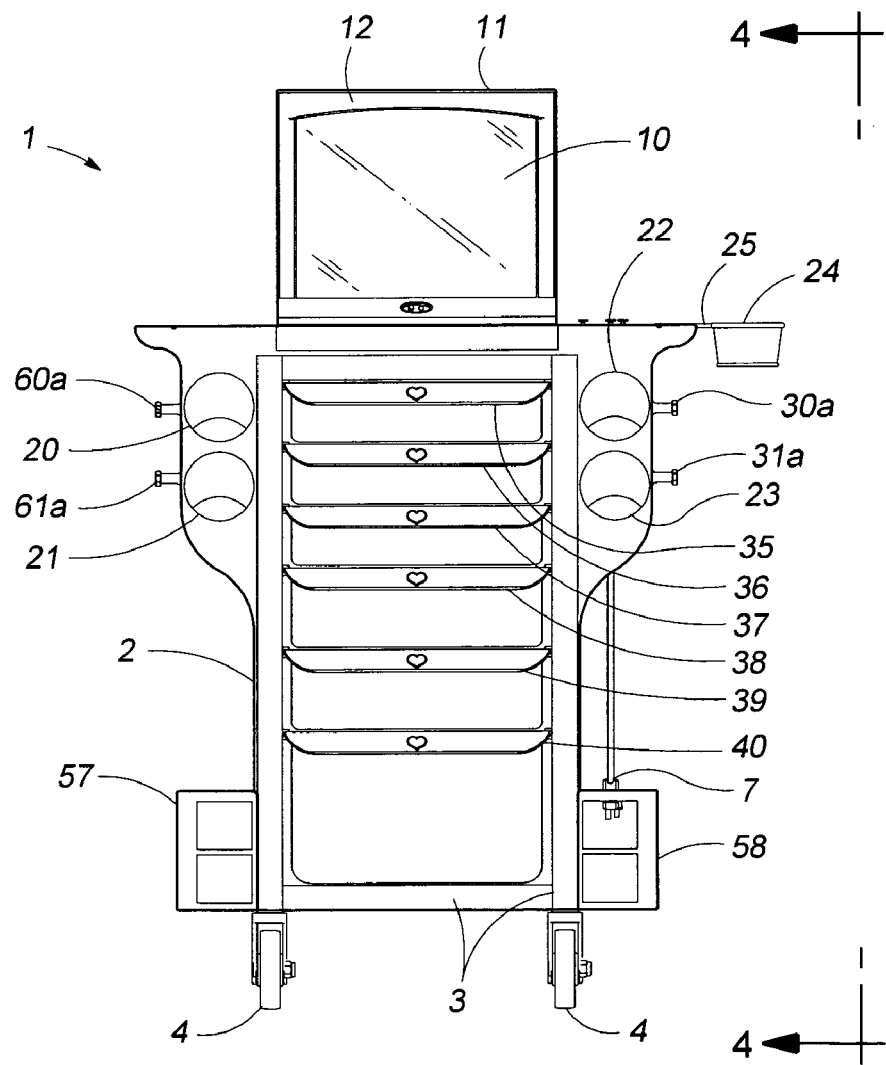

VANITY CART WITH MIRROR

FIELD OF THE INVENTION

The present invention relates to a vanity cart for organizing and storing styling tools and other personal care items.

BACKGROUND OF THE INVENTION

The typical dressing area of a bathroom is replete with counters and drawers full of personal care items such as brushes, combs, toothbrushes, razors, and lotions. Additionally, women often use numerous cosmetic products, such as lipsticks, eye makeup, foundations, and applicators. The clutter is compounded by the presence of electrical styling tools such as curling irons, hair dryers, and flat irons. Often the items are simply put under the sink or stuffed into drawers.

The need to organize and store such items between uses has led to the development of some generic storage containers, in the form of bins, racks, or carts. However, typically the personal care items must be removed from the container and used at the sink or at the vanity counter, and then returned to the container. Styling tools must be plugged into wall outlets and then unplugged before they are returned to the storage container. Cabinets used in beauty salons are typically very heavy and difficult, if not impossible, to move. None of the presently-available storage options succeed in organizing all the personal care articles one needs into a single unit, which can be transported from the bathroom to a more convenient location, or simply moved out-of-the way or into a closet between uses. None of the presently-available storage options provides electrical receptacles for the appliances, as well as a lighted mirror for checking one's reflection.

SUMMARY OF THE INVENTION

The present invention provides a lightweight vanity cart for organizing and storing electrical hair styling tools and personal care items, including cosmetics, hair styling products, lotions, cleansers, applicators, brushes, and other miscellaneous items. The vanity cart has a metal frame which supports a molded plastic shroud. It is mounted on wheels for ease of movement to any location in one's home. It has cylindrical holders with a heat-resistant coating for storing styling tools. Electrical receptacles allow the power cords of the styling tools to remain plugged in between uses. A master power cord allows the unit to be connected to a wall receptacle, and a main power switch controls power to all of the receptacles. Pairs of hooks are provided for wrapping the cords of the styling tools, keeping the cords from becoming tangled during and between uses.

A lighted mirror on the top of the unit is mounted in a frame that pivots between a closed position, where the frame serves as a lid, and an open position, which exposes a flat surface area for temporary placement of various personal care items. The mirror is framed by a lighted strip so that it can be used in areas with less-than-adequate lighting. The lighted element is controlled by a switch. Optionally, the mirror can be pivotally-mounted on extension rods so that it can be adjusted in height for use by a person who is standing; the mirror can also be easily tilted.

Drawers having varying depths provide many different options for storing cosmetics and personal care items. Dividers can be added for improved organization. Differently-sized recesses are molded into the top of the cart for storing smaller items, as well as tissues, cotton balls, etc. The recesses are typically provided with lids. Racks on the lower sides of the cart provide shelves that can be used to support cans and bottles of hair styling products. A sleeve for holding a blow dryer can be attached to either the right or left front corner of the unit.

The vanity cart can be made in a variety of colors, depending on design choice and can be decorated with decorative appliques or stickers.

It is an object of the present invention to provide a vanity cart that can be easily wheeled from one location to another.

Another object of the present invention is to provide a unit with containers and receptacles for organizing and storing a variety of personal care items.

A further object of the present invention is to provide a vanity cart equipped with electrical receptacles and a power cord to supply electricity to a number of styling tools.

A still further object of the present invention is to provide a vanity cart with receptacles to keep styling tools organized and accessible, as well as means to keep their cords from becoming tangled.

Yet another object of the present invention is to provide a vanity cart with a lighted mirror for viewing one's reflection while using the styling tools and applying cosmetics.

These and other objects of the invention will become apparent in the specification and figures of the present application.

BRIEF DESCRIPTION OF THE DRAWINGS

FIG. 2 is a top plan view of the vanity cart of the present invention.

FIG. 3 is a front plan view of the present invention with the mirror flipped up.

BRIEF DESCRIPTION OF PREFERRED EMBODIMENT

Figure 1:
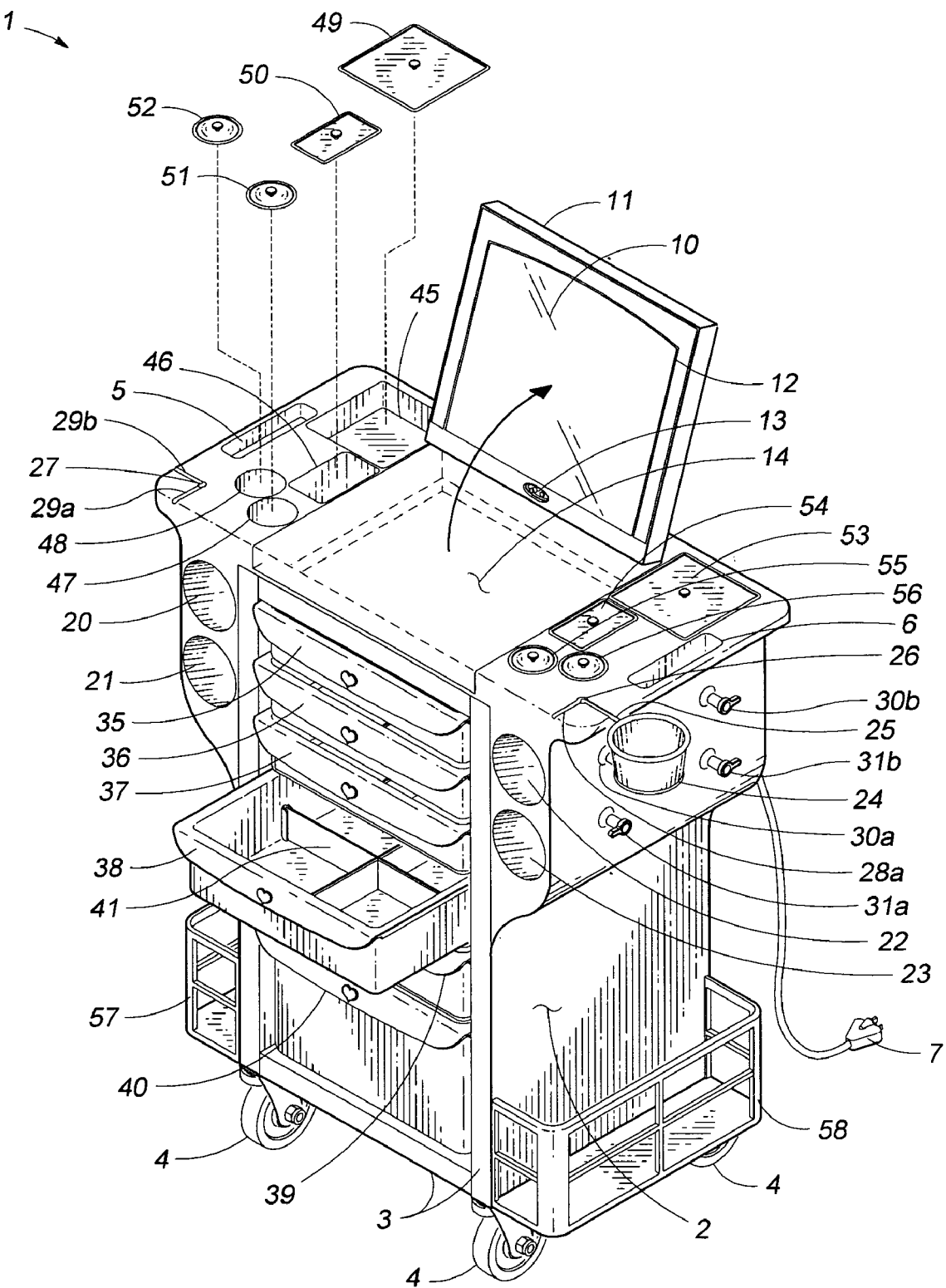
FIG. 1 is an upper right perspective view of the vanity cart of the present invention, shown with the mirror flipped up and a drawer opened.

As shown in FIG. 1, the lightweight vanity cart 1 comprises a molded plastic shroud 2 mounted onto a metal frame 3. The shroud 2 can be made from a rigid plastic such as acrylonitrile butadiene styrene (ABS), and the frame 3 made from stainless steel or another heavy-duty metal. The vanity cart I can be made in a variety of sizes. A typical size would be approximately 36 inches high, 28 inches wide and 14 inches deep. The vanity cart 1 can be made in a variety of decorative colors, depending of the user's preference. Each user in a particular household can differentiate her or his unit from another's by its color. Each user can also decorate her or his vanity cart by applying artistic stickers or appliques shaped like hearts, swirls, flowers, butterflies, stars, etc.

The frame 3 is mounted on wheels 4, so that the vanity cart 1 is easily rolled from one location to another. Openings formed on each side of the top of the shroud 2 act as handles 5, 6, for controlling the movement of the vanity cart 1. A power cord 7 attached to the back of the shroud 2 supplies electricity to the vanity cart 1 when it is plugged into a wall receptacle in order to provide power for electrical styling tools.

A mirror 10 is pivotally mounted in a rectangular frame 11 on top of the shroud 2. A light strip 12 around the perimeter of the mirror 10 is activated by a switch 13. The mirror 10 allows one to view his or her or his reflection while styling his or her or his hair or applying cosmetics. Activating the light strip 12 allows the mirror 10 to be used in low-light environments. The frame 11 holding the mirror 10 has been flipped open (see arrow) exposing a flat shallow recess 14, which can be used as a work surface when the mirror 10 is raised.

Cylindrical holders 20, 21, 22, 23 are formed as horizontal openings in the shroud 2, two on each side, approximately 2 to 3 inches in diameter, for storage of styling tools, such as curling wands and flat irons. The inner surface of the cylindrical holders 20, 21, 22, 23 can be coated with a heat-resistant material or provided with removable heat-resistant inserts, so that the styling tools can be stored after use, without waiting for them to cool. A cylindrical holster 24, in the form of a sleeve, has a handle 25, which can be inserted into either opening 26 (as shown) or 27; it can be used to hold a blower-type hair dryer. The inner surface of the holster 24 is also coated with a heat-resistant material. The position of the holster 24 can be adjusted according to the user's preference by moving the handle 25 to fit into groove 28a, (or into groove 29a or groove 29b).

Attached to the sides of the shroud 2 are pairs of hooks 30a, 30b and 31a, 31b, around which the cords of the styling tools can be wrapped. One of each pair of hooks 30a, 30b and 31a, 31b can be provided with a quick-release mechanism for immediate access to the whole cord.

Several drawers 35, 36, 37, 38, 39, 40 are disposed in the midsection of the shroud 2, supported by tracks in the frame 3. The drawers 35, 36, 37, 38, 39, 40, which are made from a sturdy plastic, can be removed for cleaning. Dividers 41 like those shown in drawer 38 can be placed in each of the drawers 35, 36, 37, 38, 39, 40 in order to organize the personal care items stored inside. The drawers 35, 36, 37, 38, 39, 40 can be made with different-sized depths to provide a variety of storage options. Additional storage is provided by storage receptacles formed on the top of the shroud 2. Square receptacle 45 could be used for a box of tissues, or it could be used as a docking station for an MP3 player. Rectangular receptacle 46 and round receptacles 47, 48 could be used for holding cotton balls, applicators, or other personal care accessories. The receptacles 45, 46, 47, 48 can be provided with drop-in containers and can be closed with lids 49, 50, 51, 52. Similar receptacles are under lids 53, 54, 55, 56. Racks 57, 58, which extend from the base on the sides of the shroud 2, can be made from stainless steel or rigid plastic. They can be used to hold bottles or cans of styling products.

The configuration of the elements on the top of the vanity cart 1 can be seen in FIG. 2. Handles 5, 6 are formed on either side of the shroud 2 for controlling the movement of the vanity cart 1. The mirror 10 in the frame 11 has been flipped open, exposing recess 14. The handle 25 of holster 24 has been inserted into opening 26. Depending on where the user wishes to store a blower-type hair dryer, its position can be adjusted by moving the handle 25 into groove 28a, or the handle 25 can be inserted into opening 27 along groove 29a or groove 29b. The lids 49, 50, 51, 52, 53, 54, 55, 56 cover the differently-shaped storage receptacles.

FIG. 3 shows the front of the vanity cart 1, with the shroud 2 mounted onto the metal frame 3, which is mounted on wheels 4. The cylindrical holders 20, 21, 22, 23 are shown to have been formed sloping back and downwards in the range of ten to twenty degrees from horizontal in order to keep styling tools from falling out. The holster 24 for a blower-type hair dryer is attached to the shroud 2 by handle 25. Drawers 35, 36, 37, 38, 39, 40 can be used to organize and store a myriad of personal care items. Hooks 30a, 31a, 60a, and 61a are halves of pairs of hooks that can be used to wrap the cords of hair styling tools. Racks 57, 58 can be used to store bottles and cans of styling products. Power cord 7 is plugged into a wall receptacle. The frame 11 holding the mirror 10, with a light strip 12 around its perimeter, has been flipped open.

Figures 4, 5:
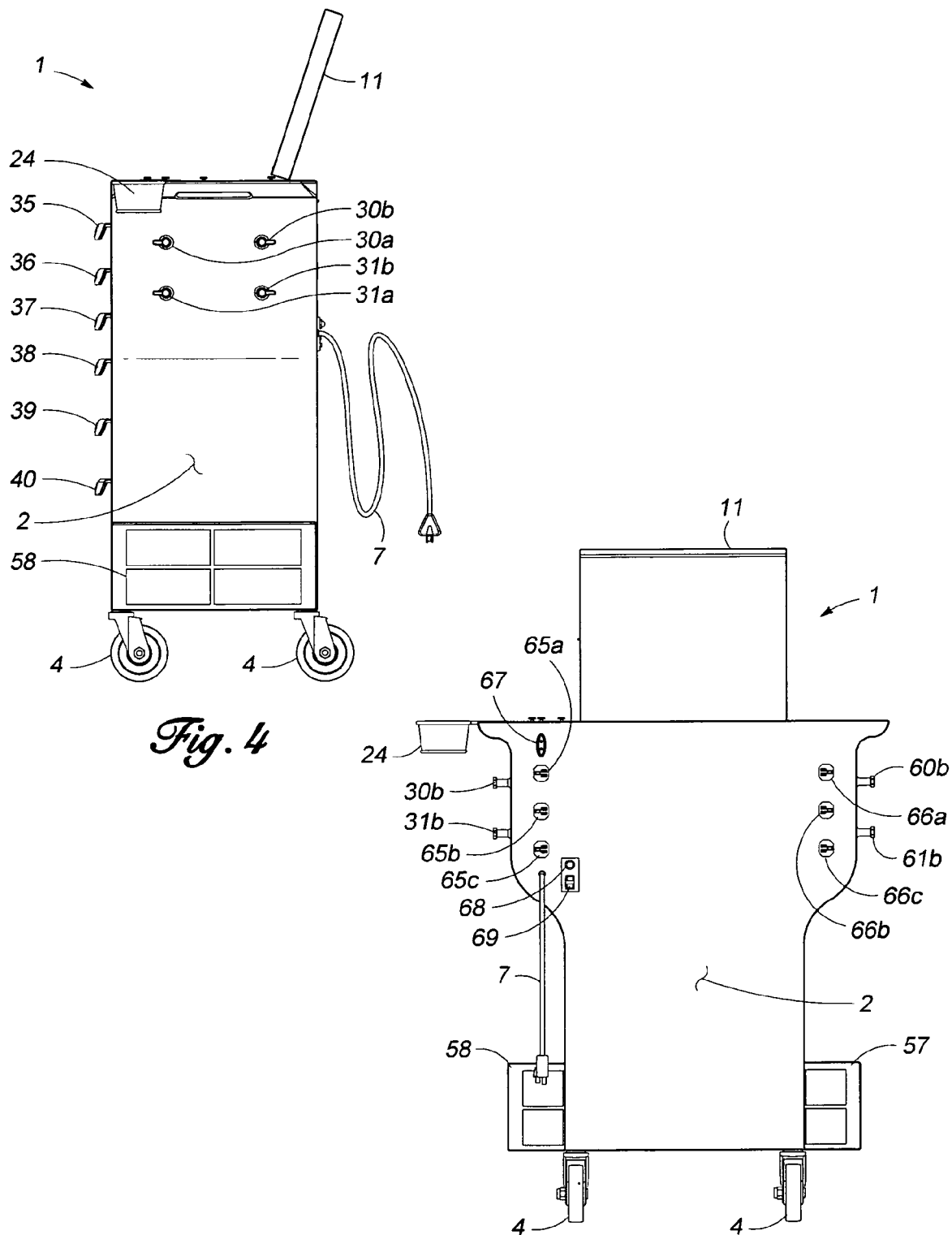
FIG. 4 is a side elevational view of the vanity cart with the mirror flipped open.
FIG. 5 is a back elevational view of the vanity cart showing the electrical receptacles and the main power switch.

The side view of FIG. 4 shows the side of shroud 2, to which are attached pairs of hooks 30a, 30b and 31a, 31b, which can be used to wrap the cords of hair styling tools. The frame 11 of the mirror (10) is open and tilted back for easy viewing of one's reflection. Holster 24 can be seen, as well as the sides of the formed handles of drawers 35, 36, 37, 38, 39, 40, and rack 58, which is used to store bottles and cans of styling products. Wheels 4 allow the cart to be rolled from location to location, and power cord 7 is used to supply electrical power.

FIG. 5 shows the back of the vanity cart 1. The frame 11 of the mirror (10) is in an open position. Hooks 30b, 31 b, 60b, and 61b are the complementary halves of pairs of hooks that can be used to wrap the cords of hair styling tools. The back of the holster 24 and the backs of racks 57, 58 can be seen. Set into the back of the shroud 2 are six electrical receptacles 65a, 65b, 65c, 66a, 66b, 66c, arranged with a row of three on each side. American models of the vanity cart 1 will be equipped with standard 110 volt receptacles, while European models will be equipped with specialized outlets. The user of the vanity cart 1 can plug the cords of a variety of electrical styling tools into the electrical receptacles 65a, 65b, 65c, 66a, 66b, 66c and can allow them to remain plugged in between uses. A main on/off switch 67 controls the power supply to the receptacles 65a, 65b, 65c, 66a, 66b, 66c, with a power light 68 letting the user know the electricity is "on" or "off". A circuit breaker 69 interrupts the flow of electricity in the event of a power surge.

Figure 6:
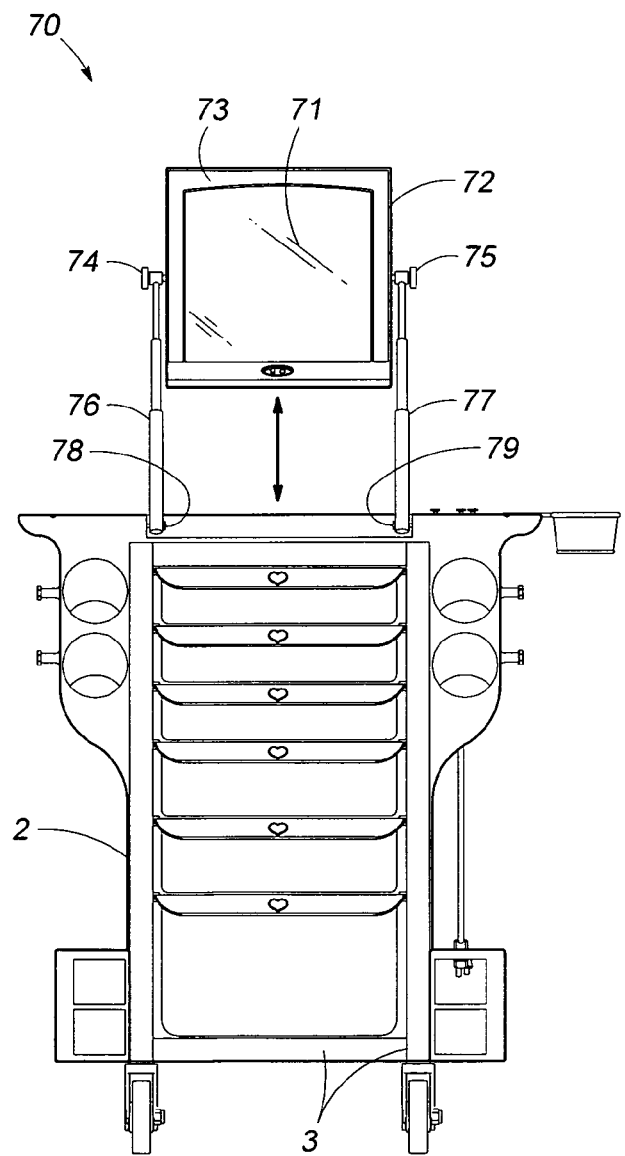
FIG. 6 is a front elevational view of an alternate embodiment of the vanity cart, made with a mirror than can be elevated.

An alternate embodiment of the vanity cart 70 is shown in FIG. 6. The shroud 2 mounted on the frame 3 is the same as that shown in FIG. 1. However, the mirror 71 in frame 72, with lighted strip 73, is pivotally-mounted on each side with pins 74, 75, which fit onto the ends of extension rods 76, 77, which are pivotally-mounted on the shroud 2 with pins 78, 79. As a result, the mirror 71 can be raised in height for use when one is standing.

Figure 7:
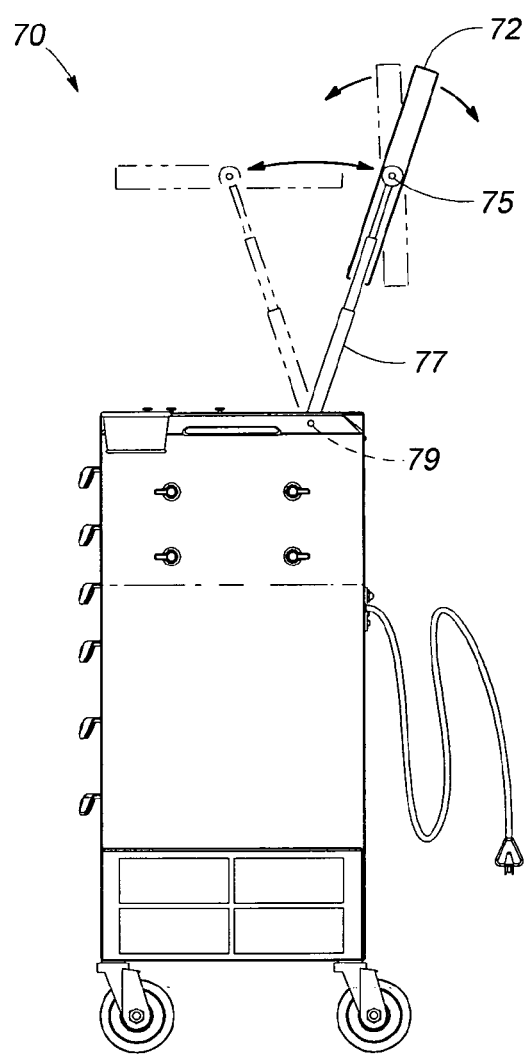
FIG. 7 is a side elevational view of the alternate embodiment of the vanity cart, showing adjustments to the mirror.

As shown in FIG. 7, the frame 72 of the mirror (10) can be raised by extending extension rod 77, then tilting and pivoting the frame 72 at pins 75 and 79.

Figure 8:
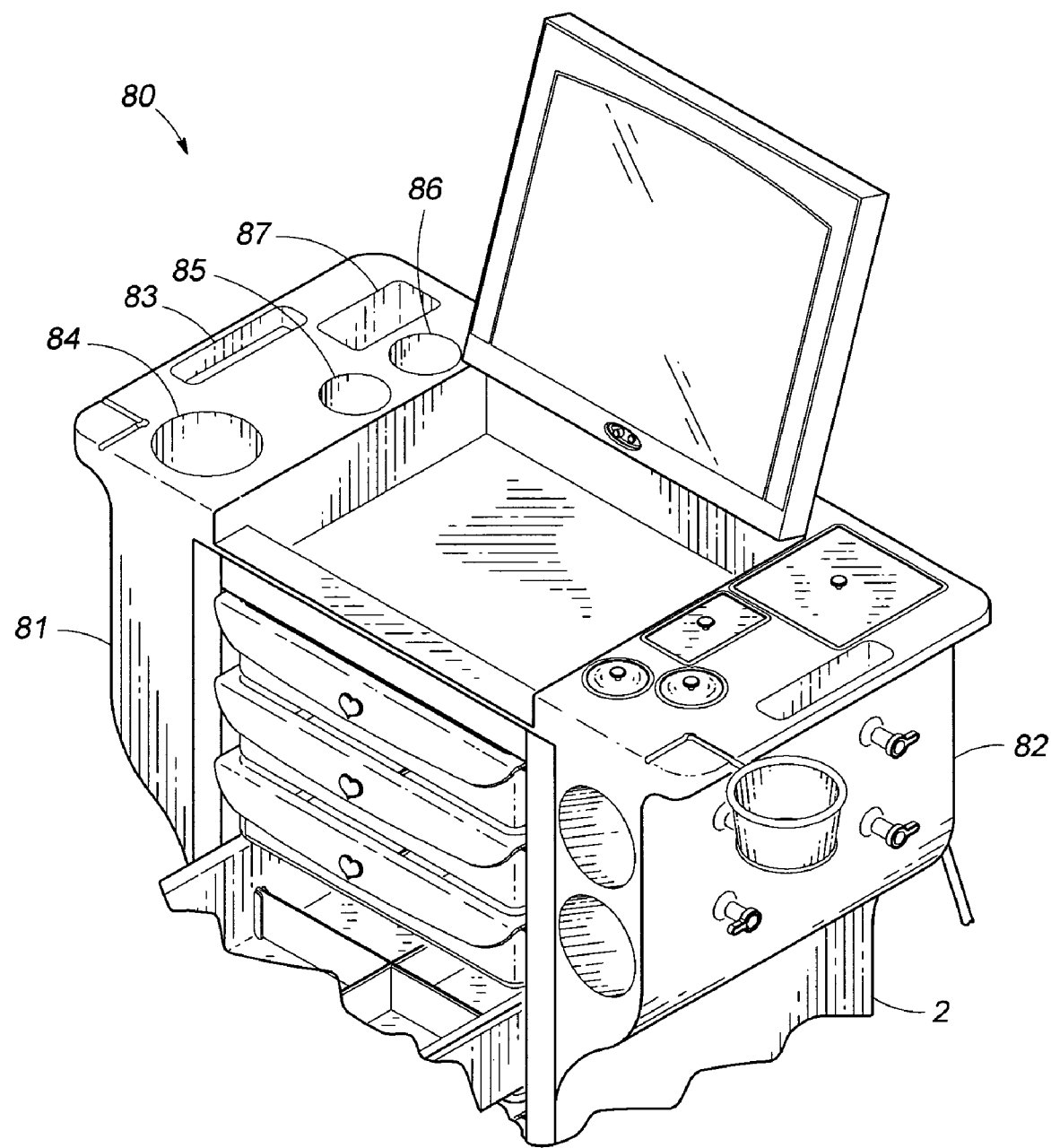
FIG. 8 is a partial upper right perspective view of another alternate embodiment of the present invention, showing an alternate arrangement of receptacles for styling tools.

FIG. 8 shows another alternate embodiment of the vanity cart 80, with different means for storing styling tools. The left side 81 of the shroud 2 is molded to have a different appearance than the right side 82 of the shroud 2. Handle 83 is used to control movement of the vanity cart 80. Vertical cylindrical holders 84, 85, 86 have been formed to hold styling tools such as styling wands. Vertical rectangular storage holder 87 can be used to store a flat iron. The inner surface of the vertical cylindrical holders 84, 85, 86 and vertical rectangular holder 87 can be coated with a heat-resistant material, or provided with removable heat-resistant inserts, so that the styling tools can be stored after use without waiting for them to cool.

While this invention has been described as having preferred designs, the present invention can be further modified within the spirit and scope of this disclosure. This application is intended to cover any variations, uses or adaptations of the invention using its general principles. Further, this application is intended to cover such departures from the present disclosure as come within known or customary practice in the art to which this invention pertains and which fall within the limits of the appended claims.

I claim:

1. A lightweight vanity cart comprising:
   a rigid plastic shroud having a top surface, a back portion, a first side, a second side, an open front, and a bottom;
   a metal frame upon which the shroud is mounted;
   a plurality of wheels upon which the frame is mounted;
   a plurality of removable drawers slidably inserted in the open front of the shroud;
   a mirror in a frame, the frame having a lower portion pivotally mounted onto the top of the shroud, whereby the mirror can pivot from a closed position to an open position;
   at least one generally horizontal cylindrical opening formed along the first side of the shroud;
   electrical supply means including at least one electrical receptacle installed on the back portion for receiving prongs of an electrical appliance power cord, the electrical supply means being connected to an electrical power supply cord.

2. The vanity cart of claim 1 wherein the shroud is made from acrylonitrile butadiene styrene (ABS) using an injection-molding process.

3. The vanity cart of claim 1 which further includes at least one divider in one of the drawers.

4. The vanity cart of claim 1 which further includes at least one generally horizontal cylindrical opening formed along the second side of the shroud.

5. The vanity cart of claim 4 which future includes making the cylindrical openings heat-resistant by using heat-resistant inserts or a heat-resistant coating material.

6. The vanity cart of claim 1 which further includes at least one generally vertical cylindrical opening formed in the top surface of the shroud.

7. The vanity cart of claim 6 which further includes making the cylindrical openings heat-resistant by using heat-resistant inserts or a heat-resistant coating material.

8. The vanity cart of claim 1 wherein the top surface has a left section, a mid-section, and a right section, the mirror covering the mid-section when it is in a closed position, and wherein at least one of the left section or the right section has formed therein a plurality of storage receptacles.

9. The vanity cart of claim 1 wherein the mirror in the frame has a perimeter and a light strip is disposed around the perimeter of the mirror.

10. The vanity cart of claim 1 which further comprises a first rack extending from a lower portion of the first side of the shroud and a second rack extending from a lower portion of the second side of the shroud.

11. A lightweight vanity cart comprising:
    a rigid plastic shroud having a top surface, a back portion, a first side, a second side, an open front, and a bottom;
    a metal frame upon which the shroud is mounted;
    a plurality of wheels upon which the frame is mounted;
    a plurality of removable drawers slidably inserted in the open front of the shroud;
    a pair of extension rods, each of the pair having a first end and a second end, the first ends of the extension rods being pivotally mounted on the top surface of the shroud;
    a mirror in a frame, the frame having a lower portion pivotally mounted onto the second ends of the extension rods, whereby the mirror can pivot from a closed position to an open position and can be raised and lowered;
    at least one generally horizontal cylindrical opening formed along the first side of the shroud;
    electrical supply means including at least one electrical receptacle installed on the back portion for receiving prongs of an electrical appliance power cord, the electrical supply means being connected to an electrical power supply cord.

12. The vanity cart of claim 11 wherein the shroud is made from acrylonitrile butadiene styrene (ABS) using an injection-molding process.

13. The vanity cart of claim 11 which further includes at least one divider in one of the drawers.

14. The vanity cart of claim 11 which further includes at least one generally horizontal cylindrical opening formed along the second side of the shroud.

15. The vanity cart of claim 14 which future includes making the cylindrical openings heat-resistant by using heat-resistant inserts or a heat-resistant coating material.

16. The vanity cart of claim 11 which further includes at least one generally vertical cylindrical opening formed in the top surface of the shroud.

17. The vanity cart of claim 16 which further includes making the cylindrical openings heat-resistant by using heat-resistant inserts or a heat-resistant coating material.

18. The vanity cart of claim 11 wherein the top surface has a left section, a mid-section, and a right section, the mirror covering the mid-section when it is in a closed position, and wherein at least one of the left section or the right section has formed therein a plurality of storage receptacles.

19. The vanity cart of claim 11 wherein the mirror in the frame has a perimeter and a light strip is disposed around the perimeter of the mirror.

20. The vanity cart of claim 11 which further comprises a first rack extending from a lower portion of the first side of the shroud and a second rack extending from a lower portion of the second side of the shroud.

* * * * *